United States Patent
Inoue et al.

(10) Patent No.: US 12,515,779 B2
(45) Date of Patent: Jan. 6, 2026

(54) MARINE VESSEL MANEUVERING SYSTEM, AND MARINE VESSEL

(71) Applicant: YAMAHA HATSUDOKI KABUSHIKI KAISHA, Iwata (JP)

(72) Inventors: Hiroshi Inoue, Shizuoka (JP); Katsutoshi Naito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 292 days.

(21) Appl. No.: 18/128,276

(22) Filed: Mar. 30, 2023

(65) Prior Publication Data

US 2023/0331364 A1  Oct. 19, 2023

(30) Foreign Application Priority Data

Apr. 14, 2022 (JP) .................. 2022-066879

(51) Int. Cl.
- *B63B 79/40* (2020.01)
- *B63H 25/04* (2006.01)
- *G05D 1/00* (2006.01)
- *B63B 49/00* (2006.01)

(52) U.S. Cl.
CPC ........... *B63H 25/04* (2013.01); *G05D 1/0206* (2013.01); *B63B 49/00* (2013.01); *B63H 2025/045* (2013.01)

(58) Field of Classification Search
CPC .............. B63H 25/04; B63H 2025/045; G05D 1/0206; B63B 49/00
See application file for complete search history.

(56) References Cited

U.S. PATENT DOCUMENTS

| | | | |
|---|---|---|---|
| 6,488,109 B1 * | 12/2002 | Igaki | B60T 8/17557 180/274 |
| 12,205,474 B2 * | 1/2025 | Shimokawabe | G06F 3/04847 |
| 12,223,835 B1 * | 2/2025 | Plascencia-Vega | G08G 1/161 |
| 2021/0271245 A1 * | 9/2021 | Bradley | G05D 1/227 |

FOREIGN PATENT DOCUMENTS

| | | | | |
|---|---|---|---|---|
| EP | 4474267 A1 * | 12/2024 | | B63B 79/40 |
| JP | 2001-114081 A | 4/2001 | | |
| JP | 2003-48524 A | 2/2003 | | |

* cited by examiner

Primary Examiner — Masud Ahmed
(74) Attorney, Agent, or Firm — Keating & Bennett, LLP

(57) ABSTRACT

A marine vessel maneuvering system that is able to avoid a collision with an object includes a controller configured or programmed to function as a judging unit to judge whether or not there is a collision possibility of a collision between an object and a marine vessel, wherein the controller is configured or programmed to execute a deceleration control in response to the judging unit judging that there is the collision possibility.

22 Claims, 6 Drawing Sheets

MARINE VESSEL MANEUVERING SYSTEM, AND MARINE VESSEL

CROSS REFERENCE TO RELATED APPLICATIONS

This application claims the benefit of priority to Japanese Patent Application No. 2022-066879, filed on Apr. 14, 2022. The entire contents of this application are hereby incorporated herein by reference.

BACKGROUND OF THE INVENTION

1. Field of the Invention

The present invention relates to a marine vessel maneuvering system and a marine vessel.

2. Description of the Related Art

In the field of automobiles, there is known a technique in which, when an obstacle that is likely to collide with a vehicle is detected, a collision avoidance measure such as automatically activating a brake to stop the vehicle is taken (for example, see Japanese Laid-Open Patent Publication (kokai) No. 2001-114081). On the other hand, marine vessels generally do not include brakes. When a marine vessel user who maneuvers a marine vessel judges that there is a possibility of a collision with another marine vessel or an object, the marine vessel user avoids the collision in advance, for example, by manually turning the marine vessel or manually decelerating the marine vessel.

However, depending on the maneuvering skills of the marine vessel user, sometimes it is difficult to determine whether or not an object may collide with the marine vessel.

SUMMARY OF THE INVENTION

Preferred embodiments of the present invention provide marine vessel maneuvering systems and marine vessels that are each able to avoid a collision with an object.

According to a preferred embodiment of the present invention, a marine vessel maneuvering system includes a controller configured or programmed to function as a judging unit to judge whether or not there is a collision possibility of a collision between an object and a marine vessel, wherein the controller is configured or programmed to execute a deceleration control in response to the judging unit judging that there is the collision possibility.

According to another preferred embodiment of the present invention, a marine vessel maneuvering system includes a controller configure or programmed to function as a judging unit to judge whether or not there is a collision possibility of a collision between an object and a marine vessel in a traveling direction of the marine vessel, wherein the controller is configured or programmed to execute a deceleration control in response to the judging unit judging that there is the collision possibility.

According to another preferred embodiment of the present invention, a marine vessel includes a marine vessel maneuvering system including a controller configured or programmed to function as a judging unit to judge whether or not there is a collision possibility of a collision between an object and the marine vessel, wherein the controller is configured or programmed to execute a deceleration control in response to the judging unit judging that there is the collision possibility.

According to another preferred embodiment of the present invention, a marine vessel includes a marine vessel maneuvering system includes a controller configured or programmed to function as a judging unit to judge whether or not there is a collision possibility of an object with the marine vessel in a traveling direction of the marine vessel, wherein the controller is configured or programmed to execute a deceleration control in response to the judging unit judging that there is the collision possibility.

According to the preferred embodiments of the present invention, it is judged whether or not there is the collision possibility of a collision between the object and the marine vessel, and as the deceleration control, for example, a fixed point holding control is executed in response to it being judged that there is the collision possibility of the object with the marine vessel. As a result, it is possible to avoid the collision with the object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
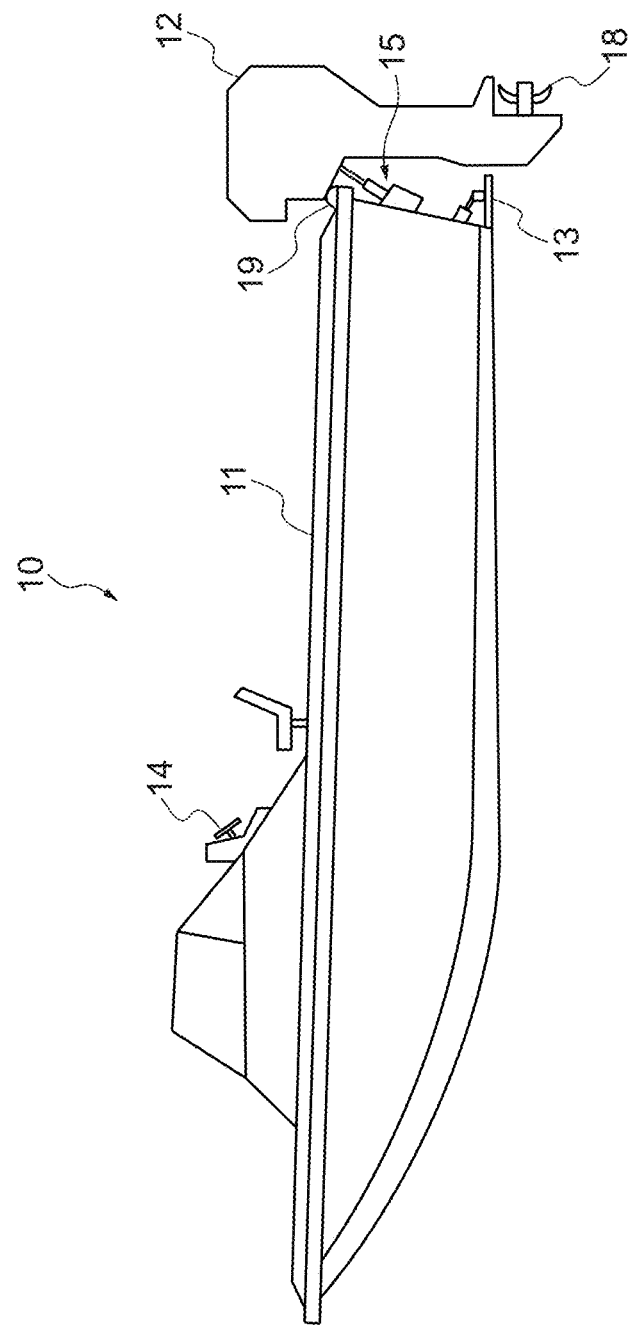
FIG. 1 is a side view of a marine vessel to which a marine vessel maneuvering system according to a preferred embodiment of the present invention is applied.

FIG. 1 is a side view of a marine vessel to which a marine vessel maneuvering system according to a preferred embodiment of the present invention is applied. A marine vessel 10 shown in FIG. 1 is a planing boat and includes a hull 11, a plurality of outboard motors 12 that function as marine vessel propulsion devices and are mounted on the hull 11, and a plurality of trim tabs 13. A steering wheel 14 is provided near a maneuvering seat of the hull 11.

The respective outboard motors 12 are mounted side by side on the stern of the hull 11. Each of the outboard motors 12 obtains a propulsion force (a thrust) from a propeller 18 (including propulsion blades) which is rotated by a driving force of a corresponding engine 42 (see FIG. 2). It should be noted that the number of the outboard motors 12 does not matter.

As shown in FIG. 1, each outboard motor 12 is attached to the hull 11 via an attachment unit 19, and rotates about a substantially vertical steering shaft (not shown) in the attachment unit 19 in response to an operation of the steering wheel 14. As a result, the marine vessel 10 is steered. Each trim tab 13 is attached to the stern of the hull 11 and swings about a substantially horizontal swing shaft (not shown) at the stern. As a result, the lift generated at the stern of the hull 11 is adjusted and the attitude of the hull 11 is controlled.

The attachment unit 19 includes a PTT (Power Trim and Tilt) unit 15. The PTT unit 15 rotates the outboard motor 12 about a tilt shaft (not shown) with respect to the hull 11 and changes an inclination angle (a trim angle or a tilt angle) of the outboard motor 12 with respect to the hull 11.

Figure 2:
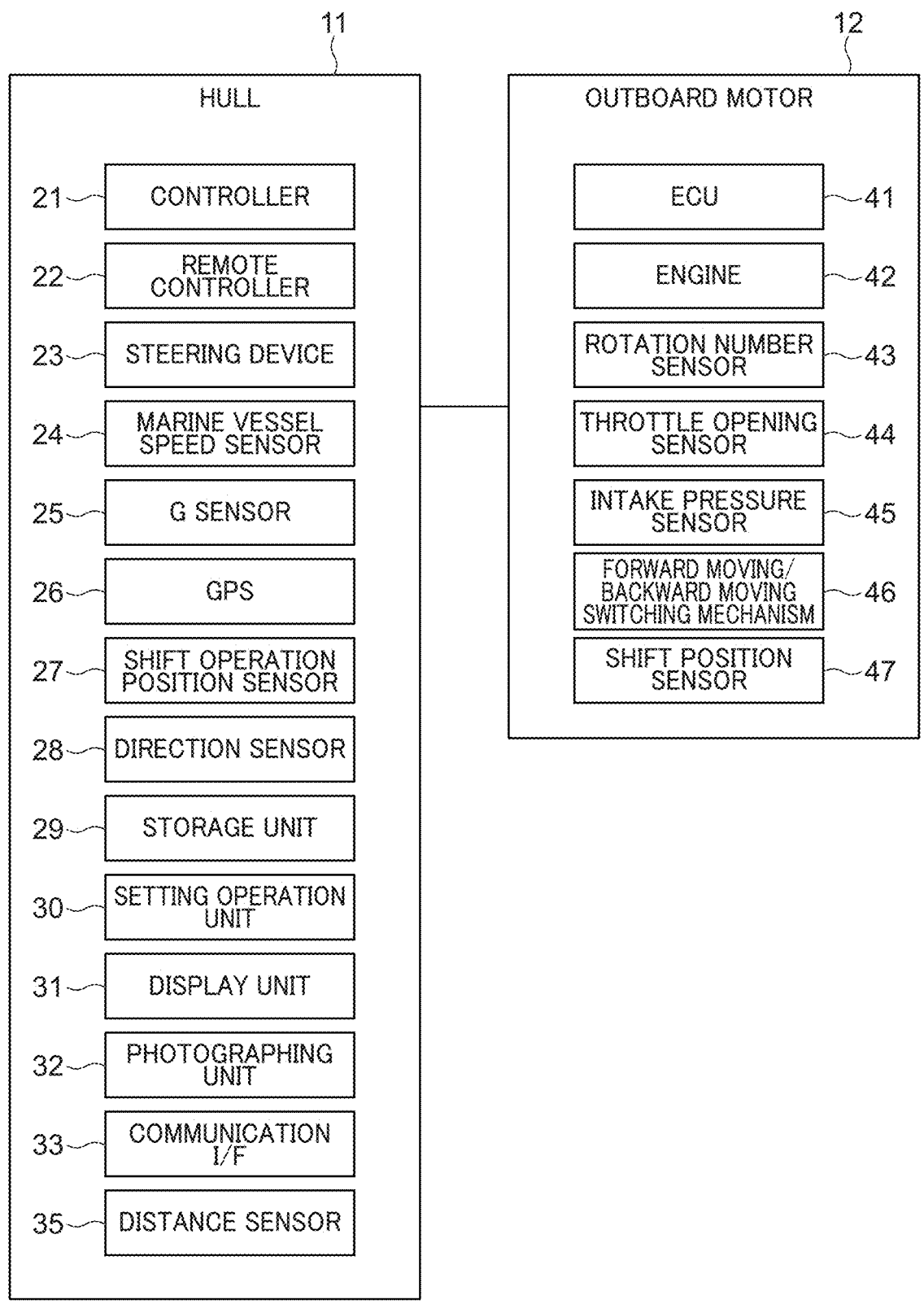
FIG. 2 is a block diagram for schematically explaining respective components included in the marine vessel shown in FIG. 1.

FIG. 2 is a block diagram for schematically explaining respective components included in the marine vessel 10. The hull 11 includes a controller 21, a remote controller 22, a steering device 23, a marine vessel speed sensor 24, a G sensor 25, a GPS (Global Positioning System) 26, a shift operation position sensor 27, a direction sensor 28, a storage unit 29, a setting operation unit 30, a display unit 31, a photographing unit 32, a communication I/F (interface) 33, and a distance sensor 35.

The outboard motor 12 includes an ECU (Engine Control Unit) 41, the engine 42, a rotation number sensor 43, a throttle opening sensor 44, an intake pressure sensor 45, a forward moving/backward moving switching mechanism 46, and a shift position sensor 47.

The controller 21 is, for example, a BCU (Boat Control Unit). The controller 21 controls operations of the respective components of the marine vessel 10 according to various kinds of programs. The controller 21 includes a CPU (Central Processing Unit) (not shown), a ROM (Read Only Memory) (not shown), a RAM (Random Access Memory) (not shown), a timer (not shown), etc. Control programs executed by the CPU are stored in the ROM. The RAM provides a working area when the CPU executes the control program.

The remote controller 22 includes levers (not shown) corresponding to the respective outboard motors 12. By operating each lever, a marine vessel user is able to switch a direction of the thrust generated by the corresponding outboard motor 3 between a forward moving direction and a backward moving direction, and adjust the output of the corresponding outboard motor 3 so as to adjust a marine vessel speed of the marine vessel 10.

The steering device 23 enables the marine vessel user to determine the course of the marine vessel 10. The marine vessel user is able to change the course of the marine vessel 10 to left or right by rotatably operating the steering wheel 14 of the steering device 23 leftward or rightward. The marine vessel speed sensor 24 measures a speed of the marine vessel 10 (the marine vessel speed). The G sensor 25 measures accelerations acting on the hull 11 in three axial directions. The GPS 26 measures a position of the marine vessel 10 in the earth coordinate system. It should be noted that the controller 21 may obtain the marine vessel speed of the marine vessel 10 from GPS signals. Alternatively, the controller 21 may obtain the marine vessel speed of the marine vessel 10 by a prediction based on an engine rotation number (a rotation number of the engine 42) or the like.

The shift operation position sensor 27 detects a shift operation position, which is instructed to the forward moving/backward moving switching mechanism 46. The shift operation position is issued by an operation of the remote controller 22. The direction sensor 28 detects a direction of the marine vessel 10 (an azimuth of the marine vessel 10). The storage unit 29 is a non-volatile memory. The setting operation unit 30 includes an operator (not shown) to perform operations related to marine vessel maneuvering, a PTT operation switch (not shown), a setting operator (not shown) to perform various kinds of settings, and an inputting operator (not shown) to input various kinds of instructions.

The display unit 31 is a display to display various kinds of information, and also functions as a touch panel to accept inputs from the marine vessel user. The photographing unit 32 is a camera that is able to photograph moving images and still images. The communication I/F 33 has a communication function via the Internet or the like, and wirelessly communicates with an external apparatus. It should be noted that the communication I/F 33 may have a wired communication function.

The distance sensor 35 is a non-contact sensor that detects a distance to an object to be detected. The configuration of the distance sensor 35 does not matter, and for example, is able to use an optical type, a radio wave (millimeter wave) type, an ultrasonic type, or the like.

The ECU 41 is a controller for the engine 42 and controls the engine 42 according to control signals issued by the controller 21. The rotation number sensor 43 measures the rotation number of the engine 42. The throttle opening sensor 44 detects a throttle opening (an opening of a throttle valve (not shown) of the engine 42). The intake pressure sensor 45 measures an intake pressure of the engine 42.

The forward moving/backward moving switching mechanism 46 includes a shift link mechanism (not shown) and a clutch mechanism (not shown), and the engine 42 and the clutch mechanism are connected by a drive shaft (not shown). The ECU 41 switches a shift position of the forward moving/backward moving switching mechanism 46 among a forward state (F), a reverse state (R), and a neutral state (N) in response to the shift operation position issued by the operation of the remote controller 22. The shift position sensor 47 detects the current shift position of the forward moving/backward moving switching mechanism 46.

In the marine vessel 10, the respective components 21 to 33, 35, and 41 to 47 described above are connected to each other by a CAN (Control Area Network) that is a network in which a plurality of nodes are individually connected to a bus. The detection results and the measurement results, which are obtained by the components 24 to 28, 35, 43 to 45, and 47, are transmitted to the controller 21. It should be noted that the respective components of the marine vessel 10 may be connected to each other not by the CAN but by a LAN (Local Area Network) such as Ethernet (registered trademark) that provides connections via a network device, or the respective components of the marine vessel 10 may be directly connected to each other.

In addition, the hull 11 or the outboard motor 12 includes various actuators (not shown). The various actuators include a mechanism to rotate each outboard motor 12 around the steering shaft, a mechanism to switch the shift position of the forward moving/backward moving switching mechanism 46, a mechanism to adjust the throttle opening, a mechanism to drive the trim tabs 13, etc. The various actuators also include actuators to realize automatic pilot (automatic marine vessel maneuvering).

In a preferred embodiment of the present invention, settable marine vessel maneuvering modes include a normal marine vessel maneuvering mode (a normal marine vessel maneuvering control) and automatic marine vessel maneuvering modes. The normal marine vessel maneuvering mode is a mode in which the marine vessel 10 navigates according to the operation of the marine vessel user. The automatic marine vessel maneuvering modes include a first automatic marine vessel maneuvering mode and a second automatic marine vessel maneuvering mode. It should be noted that the automatic marine vessel maneuvering modes shown here are just examples, and the type of automatic marine vessel maneuvering mode does not matter.

Figure 3:
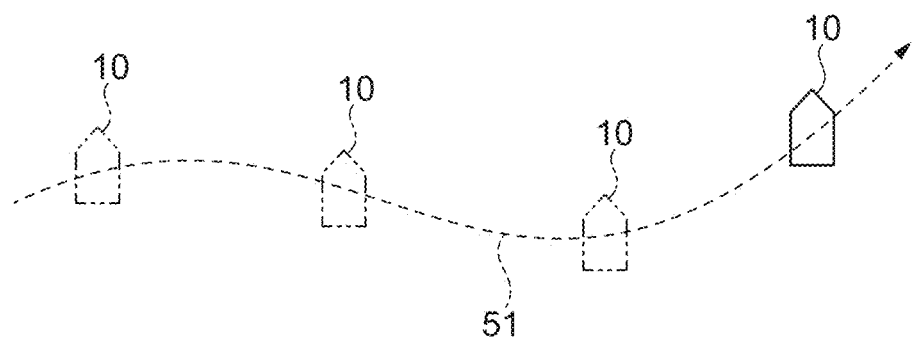
FIG. 3 shows how the marine vessel shown in FIG. 1 moves in a first automatic marine vessel maneuvering mode.
Figure 4:
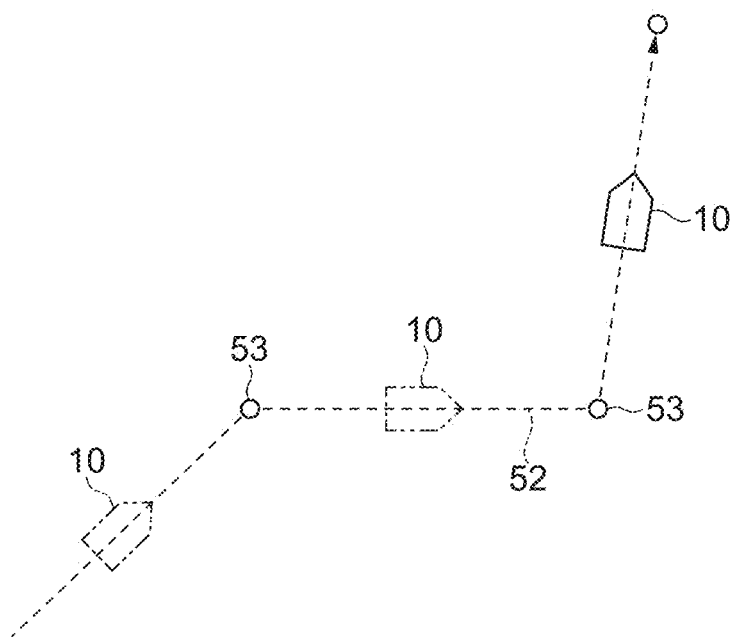
FIG. 4 shows how the marine vessel shown in FIG. 1 moves in a second automatic marine vessel maneuvering mode.

FIG. 3 shows how the marine vessel 10 moves in the first automatic marine vessel maneuvering mode. FIG. 4 shows how the marine vessel shown 10 moves in the second automatic marine vessel maneuvering mode. The first automatic marine vessel maneuvering mode (see FIG. 3) is a marine vessel maneuvering mode in which the direction of the marine vessel 10 (the azimuth of the marine vessel 10) is maintained. In the first automatic marine vessel maneuvering mode, the marine vessel 10 moves with a tidal current while facing the same direction. For example, as shown in FIG. 3, as a result of the controller 21 maintaining the direction of the marine vessel 10 constant, the marine vessel 10 moves on a movement route 51.

The second automatic marine vessel maneuvering mode (see FIG. 4) is a marine vessel maneuvering mode in which the marine vessel 10 follows a set navigation course. For example, as shown in FIG. 4, the marine vessel user determines a route 52 as the navigation course by setting a plurality of relay points 53 in advance. The controller 21 moves the marine vessel 10 along the route 52. It should be noted that the method of setting the navigation course does not matter.

Figure 5:
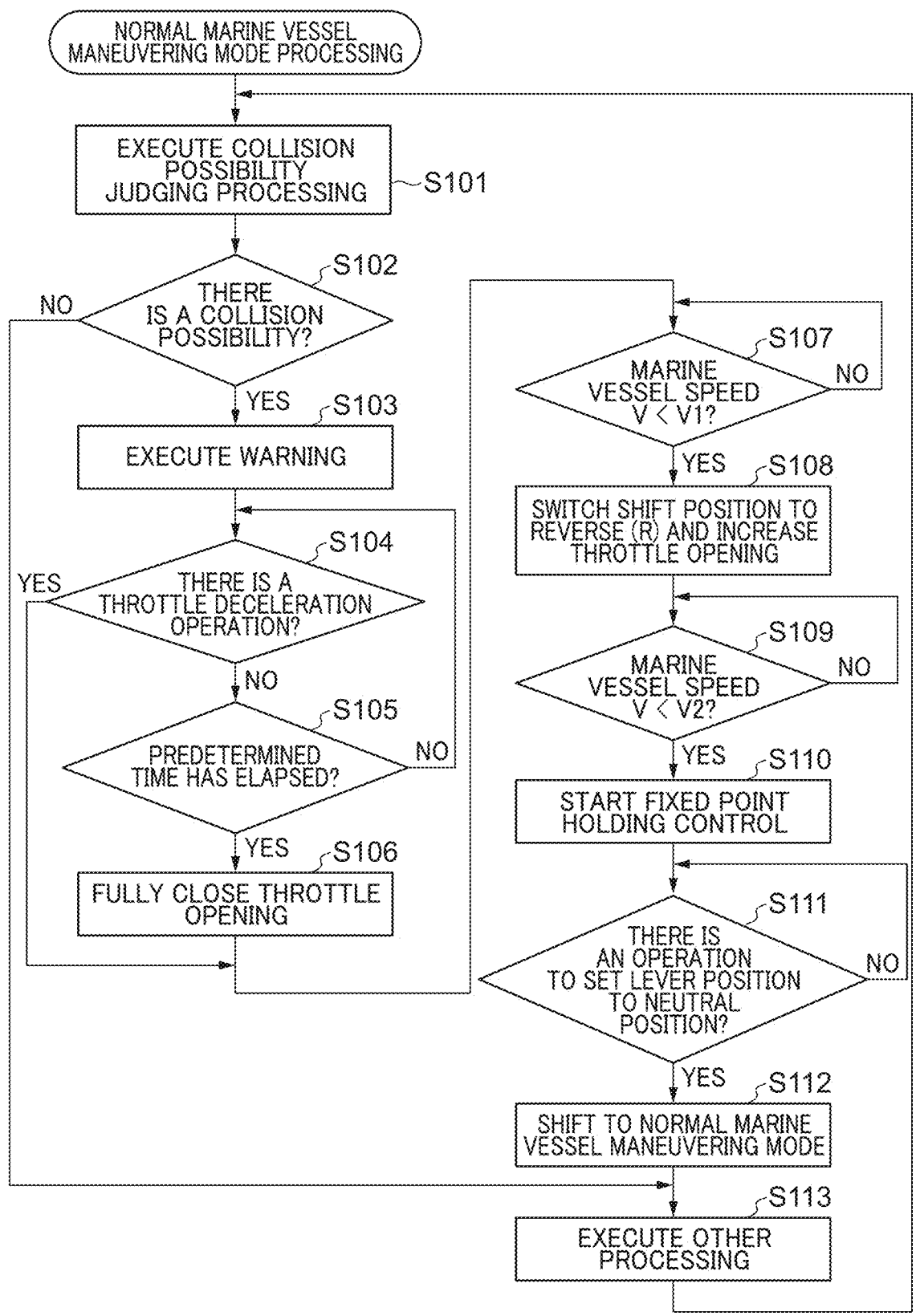
FIG. 5 is a flowchart that shows the flow of a normal marine vessel maneuvering mode process.

FIG. 5 is a flowchart that shows the flow of a normal marine vessel maneuvering mode process. In the controller 21, the normal marine vessel maneuvering mode process is realized by the CPU expanding a program, which is stored in the ROM, to the RAM and executing the program. The normal marine vessel maneuvering mode process is activated, for example, by turning on a main switch (not shown) of the marine vessel 10. Alternatively, the normal marine vessel maneuvering mode process is started when an instruction to shift the marine vessel maneuvering mode to the normal marine vessel maneuvering mode is accepted.

In a step S101, the controller 21 executes a collision possibility judging process in the normal marine vessel maneuvering mode. In the collision possibility judging process, the controller 21 judges whether or not there is a collision possibility of an object with the marine vessel 10.

As an example, first, the controller 21 identifies an object to be detected (including a marine vessel). The object to be detected is identified by image analysis based on images (the moving images or the still images) photographed by the photographing unit 32. Alternatively, the object to be detected may be identified based on a reflected wave signal or the like corresponding to a wave signal emitted by the distance sensor 35. It should be noted that the method of identifying the object to be detected does not matter and any publicly known method is able to be used as the method of identifying the object to be detected.

Then, in the case of being judged that there is an object within a predetermined radius (within a predetermined distance) centered on the marine vessel 10, the controller 21, which functions as a judging unit, judges that there is the collision possibility of the object with the marine vessel 10. Alternatively, in the case of being judged that there is an object within a predetermined distance from the marine vessel 10 in a traveling direction of the marine vessel 10, the controller 21 may judge that there is the collision possibility of the object with the marine vessel 10.

It should be noted that any publicly known method used in the field of automobiles may be applied to the collision possibility judging process. For example, based on a distance from the marine vessel 10 to an object, an estimated moving speed of the object, and the speed of the marine vessel 10 itself, the controller 21 may judge whether or not there is the collision possibility of the object with the marine vessel 10. As an example, it is possible to obtain a relative speed between the object and the marine vessel 10 itself by differentiating the distance from the marine vessel 10 to the object. Then, it is possible to estimate a moving speed of the object based on the relative speed, and the speed of the marine vessel 10 itself. It should be noted that AI (artificial intelligence) may be used to judge whether or not there is the collision possibility of the object with the marine vessel 10.

In a step S102, the controller 21 judges whether or not there is the collision possibility based on the result of the collision possibility judging process (executed in the step S101). In the case of judging that there is no collision possibility, the controller 21 advances the normal marine vessel maneuvering mode process to a step S113. On the other hand, in the case of judging that there is the collision possibility, the controller 21 advances the normal marine vessel maneuvering mode process to a step S103.

In the step S103, the controller 21 issues (executes) a warning. In the warning, the controller 21 notifies that there is the collision possibility by, for example, displaying a message or a mark on the display unit 31, emitting a sound or a voice, or the like. The warning prompts the marine vessel user to manually slow down. Therefore, in a step S104, the controller 21 judges whether or not there has been a throttle deceleration operation that decreases the throttle opening. The throttle deceleration operation is performed by, for example, the operation of the remote controller 22. In the case of judging that there is no throttle deceleration operation, the controller 21 advances the normal marine vessel maneuvering mode process to a step S105.

In the step S105, the controller 21 judges whether or not a predetermined period of time (for example, 1 second) has elapsed since judging that there is the collision possibility. In the case of judging that the predetermined period of time has not elapsed since judging that there is the collision possibility, the controller 21 returns the normal marine vessel maneuvering mode process to the step S104. In the case of being judged in the step S104 that there has been the throttle deceleration operation before the predetermined period of time has elapsed since judging that there is the collision possibility, the controller 21 advances the normal marine vessel maneuvering mode process to a step S107. On the other hand, in the case that the predetermined period of time has elapsed since judging that there is the collision possibility without the throttle deceleration operation being performed, the controller 21 advances the normal marine vessel maneuvering mode process to a step S106.

In the step S106, the controller 21 fully closes the throttle opening (makes the throttle opening become zero). Therefore, a deceleration control by fully closing the throttle opening is executed in response to being judged that there is the collision possibility. As a result, it is possible to avoid the collision with the object.

In the step S107, the controller 21 waits until the current marine vessel speed V becomes less than a first predetermined speed V1 (for example, 10 km/h), that is, the controller 21 waits until V<V1 is established. Then, when V<V1 is established, the controller 21 advances the normal marine vessel maneuvering mode process to a step S108. In the step S108, the controller 21 switches the shift position of the forward moving/backward moving switching mechanism 46 to the reverse state (R) and increases the throttle opening. As a result, it is possible to strengthen the deceleration effect. Here, the reason for waiting until V<V1 is established is to avoid applying a large load to the forward moving/backward moving switching mechanism 46. Although the throttle opening is increased by a predetermined value in the step S108, the predetermined value is not limited.

In a step S109, the controller 21 waits until the current marine vessel speed V becomes less than a second predetermined speed V2, that is, the controller 21 waits until V<V2 is established. The second predetermined speed V2 is a speed slower than the first predetermined speed V1, and is, for example, 1 km/h. It should be noted that the value of the first predetermined speed V1 and the value of the second predetermined speed V2 are stored in the ROM in advance. Then, when V<V2 is established, the controller 21 advances the normal marine vessel maneuvering mode process to a step S110. In the step S110, the controller 21 starts a fixed point holding control. Here, the reason for waiting until V<V2 is established is to smoothly shift to the fixed point holding control in a sufficiently decelerated state.

The fixed point holding control keeps the marine vessel 10 within a certain range. In the fixed point holding control, the controller 21 calculates a necessary thrust and its direction based on the position, the marine vessel speed, and the traveling direction of the marine vessel 10. For example, for each outboard motor 12, the thrust required to move the marine vessel 10 and its direction are calculated so as to eliminate a difference between the current position of the marine vessel 10 and a target position. The controller 21 then controls each outboard motor 12 according to the calculation result.

In a step S111, based on the shift operation position detected by the shift operation position sensor 27, the controller 21 waits until there is an operation to set a lever position of the remote controller 22 (the shift operation position) to a neutral position, that is, the controller 21 waits until the operation to set the lever position of the remote controller 22 to the neutral position is detected. Here, the lever of the remote controller 22 corresponds to an operator to switch the shift position of the forward moving/backward moving switching mechanism 46. The neutral position of the lever position of the remote controller 22 corresponds to a neutral position (N: neutral) as the shift position of the forward moving/backward moving switching mechanism 46. Then, when there is the operation to set the lever position to the neutral position, the controller 21 advances the normal marine vessel maneuvering mode process to a step S112. In the step S112, the controller 21 ends the fixed point holding control and shifts to the normal marine vessel maneuvering mode.

In this way, after starting the fixed point holding control, the controller 21 ends the fixed point holding control in response to detection of a lever operation to set the shift position to the neutral position, and returns to the normal marine vessel maneuvering mode. This is because there is a possibility that the marine vessel 10 may start moving unintentionally if the fixed point holding control ends while the lever position is not in the neutral position. That is, by setting that the lever position becomes the neutral position as a condition to end the fixed point holding control, it is possible to prevent the marine vessel 10 from starting moving unintentionally.

In the step S113, the controller 21 executes other processes and then returns the normal marine vessel maneuvering mode process to the step S101. Here, among the other processes executed in the step S113, the controller 21 executes, for example, a setting process and a setting change process (including switching the marine vessel maneuvering mode) that correspond to operations performed by the marine vessel user, as well as a process to end the normal marine vessel maneuvering mode process shown in FIG. 5.

Figure 6:
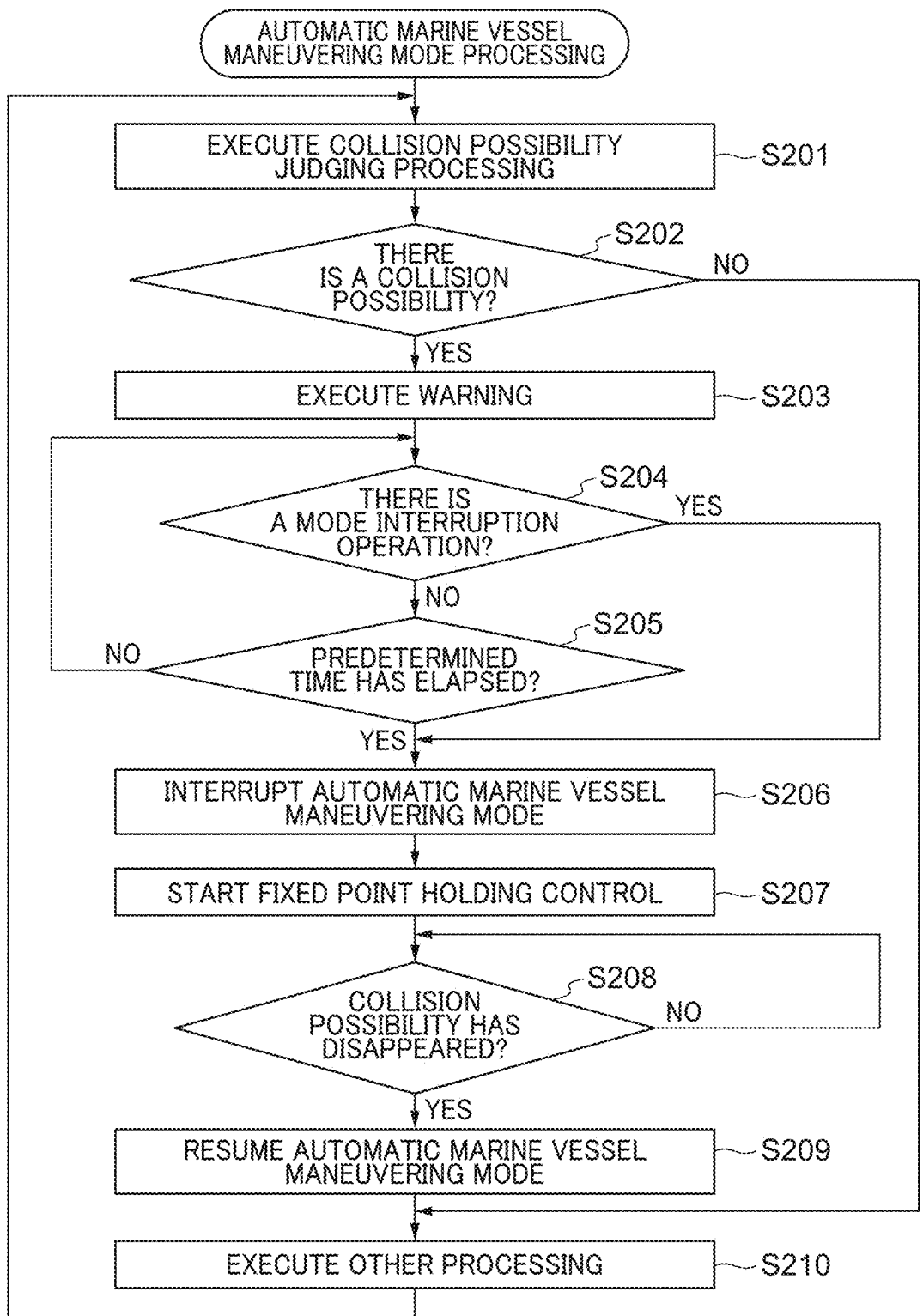
FIG. 6 is a flowchart that shows the flow of an automatic marine vessel maneuvering mode process.

FIG. 6 is a flowchart that shows the flow of an automatic marine vessel maneuvering mode process. In the controller 21, the automatic marine vessel maneuvering mode process is realized by the CPU expanding a program, which is stored in the ROM, to the RAM and executing the program. The automatic marine vessel maneuvering mode process is started, for example, when an instruction to shift the marine vessel maneuvering mode to the automatic marine vessel maneuvering mode is accepted. It should be noted that the automatic marine vessel maneuvering mode process is able to be applied to both the first automatic marine vessel maneuvering mode and the second automatic marine vessel maneuvering mode.

In a step S201, the controller 21 executes a collision possibility judging process in the automatic marine vessel maneuvering mode. In the collision possibility judging process, the controller 21 judges whether or not there is a collision possibility of an object with the marine vessel 10.

First, it is possible to use the same object identification method as that described in the step S101 and the same method of judging whether or not there is the collision possibility of the object with the marine vessel 10 as that described in the step S101. In addition to this, in the automatic marine vessel maneuvering mode, the controller 21 may judge whether or not there is the collision possibility of the object with the marine vessel 10 based on whether or not a collision with the object will occur on a predicted movement route of the marine vessel 10.

Here, in the first automatic marine vessel maneuvering mode, the predicted movement route is specified by analyzing the ever-changing moving speed and moving direction of the marine vessel 10. Furthermore, in the second automatic marine vessel maneuvering mode, the navigation course determined by the route 52 passing through the respective relay points 53 set is specified as the predicted movement route. The controller 21 judges whether or not there is the collision possibility of the object with the marine vessel 10 based on the predicted movement route of the marine vessel 10 and a predicted movement route of the object estimated based on the movement state of the object. For example, the controller 21 may judge whether or not there is the collision possibility of the object with the marine vessel 10 based on whether or not there is a possibility that a virtual circle with the predetermined radius centered on the marine vessel 10 and a virtual circle with a predetermined radius centered on the object overlap. It should be noted that any publicly known method used in the field of automobiles may be applied to the collision possibility judging process. Furthermore, AI (artificial intelligence) may be used to judge whether or not there is the collision possibility of the object with the marine vessel 10.

In a step S202, the controller 21 judges whether or not there is the collision possibility based on the result of the collision possibility judging process (executed in the step S201). In the case of judging that there is no collision possibility, the controller 21 advances the automatic marine vessel maneuvering mode process to a step S210. On the other hand, in the case of judging that there is the collision possibility, the controller 21 advances the automatic marine vessel maneuvering mode process to a step S203.

In the step S203, the controller 21 issues (executes) a warning as in the step S103. In a step S204, the controller 21 judges whether or not there has been an operation that interrupts the automatic marine vessel maneuvering mode (a mode interruption operation). The mode interruption operation is performed by, for example, the operation of the setting operator. In the case of judging that there is no operation that interrupts the automatic marine vessel maneuvering mode (the mode interruption operation), the controller 21 advances the automatic marine vessel maneuvering mode process to a step S205. It should be noted that when the remote controller 22 is operated, the automatic marine vessel maneuvering mode is released, the automatic marine vessel maneuvering mode process shown in FIG. 6 ends, and the normal marine vessel maneuvering mode is entered (shifting to the normal marine vessel maneuvering mode is performed).

In the step S205, the controller 21 judges whether or not a predetermined period of time (for example, 1 second) has elapsed since judging that there is the collision possibility. In the case of judging that the predetermined period of time has not elapsed since judging that there is the collision possibility, the controller 21 returns the automatic marine vessel maneuvering mode process to the step S204. In the case of being judged in the step S204 that there has been the operation that interrupts the automatic marine vessel maneuvering mode (the mode interruption operation) before the predetermined period of time has elapsed since judging that there is the collision possibility, the controller 21 advances the automatic marine vessel maneuvering mode process to a step S206. On the other hand, in the case that the predetermined period of time has elapsed since judging that there is the collision possibility without the operation that interrupts the automatic marine vessel maneuvering mode (the mode interruption operation) being performed, the controller 21 advances the automatic marine vessel maneuvering mode process to the step S206.

In the step S206, the controller 21 interrupts the automatic marine vessel maneuvering mode. In a step S207, the controller 21 starts a fixed point holding control as a deceleration control. As a result, it is possible to avoid the collision with the object. In a step S208, the controller 21 waits until the collision possibility disappears. It should be noted that the collision possibility judging process started in the step S201 is continuously executed. In the case of being judged that the collision possibility has disappeared, in a step S209, the controller 21 ends the fixed point holding control and resumes the automatic marine vessel maneuvering mode.

In the step S210, the controller 21 executes other processes similar to the step S113 and then returns the automatic marine vessel maneuvering mode process to the step S201.

According to a preferred embodiment of the present invention, since the fixed point holding control as the deceleration control is executed in response to being judged that there is the collision possibility of the object with the marine vessel 10 (the steps S110 and S207), it is possible to avoid the collision with the object.

In addition, after starting the fixed point holding control in the normal marine vessel maneuvering mode process, since the fixed point holding control is ended in response to detection of the operation to set the lever position to the neutral position (the steps S111 and S112), it is possible to prevent the marine vessel 10 from starting moving unintentionally.

In addition, before starting the fixed point holding control in the normal marine vessel maneuvering mode process, since the throttle opening is fully closed (the step S106), it is possible to easily avoid the collision, and it is possible to reduce or prevent the occurrence of an engine stall when switching the shift position to the reverse state (R) in the step S108.

In addition, in the case of being judged that there is the collision possibility, the controller 21 issues (executes) the warning, and in the case that the predetermined period of time has elapsed after issuing (executing) the warning without the throttle deceleration operation being performed, the controller 21 fully closes the throttle opening (the steps S103 to S106). As a result, it is possible to secure a period for prompting manual deceleration, and to automatically decelerate if there is no manual deceleration. In addition, in the case that the predetermined period of time has elapsed after issuing (executing) the warning without the mode interruption operation being performed, the automatic marine vessel maneuvering mode is interrupted (the steps S203 to S206). As a result, it is possible to secure a period for prompting manual mode-interruption, and to automatically interrupt the automatic marine vessel maneuvering mode if there is no mode interruption operation. It should be noted that providing the steps S104 and S204 is not essential. Furthermore, it is not essential to issue (execute) the warning (the steps S103 and S203). Moreover, waiting for the elapse of the predetermined period of time (the steps S105 and S205) is not essential.

In addition, after the throttle opening is fully closed, when the marine vessel speed V becomes less than the first predetermined speed V1, the controller 21 switches the shift position of the forward moving/backward moving switching mechanism 46 to the reverse state (R) and increases the throttle opening (the step S108). As a result, it is possible to actively decelerate without applying a large load to the forward moving/backward moving switching mechanism 46. In addition, after the throttle opening is fully closed, when the marine vessel speed V becomes less than the second predetermined speed V2, the controller 21 starts the fixed point holding control (the step S110). As a result, it is possible to smoothly shift to the fixed point holding control.

In addition, in the case of being judged that there is the collision possibility, since the fixed point holding control is executed after the deceleration control (the step S106) other than the fixed point holding control is started, it is possible to further reduce the collision possibility. Moreover, in the normal marine vessel maneuvering mode process, in response to being judged that there is the collision possibility, shifting to the fixed point holding control may be performed without performing a deceleration operation such as by fully closing the throttle opening. Even in this way, if the collision possibility is recognized early enough, it is possible to obtain the collision avoidance effect.

It should be noted that in the case of being judged that there is the collision possibility of the object with the marine vessel 10 in the traveling direction of the marine vessel 10, the collision avoidance effect obtained by performing the deceleration control is particularly large. However, from the viewpoint of avoiding the collision with the object, the deceleration control that is performed in response to being judged that there is the collision possibility is not limited to fully closing the throttle opening described above or the fixed point holding control described above. For example, as the deceleration control, the trim tabs 13 may be lowered, or horizontal directions of the two outboard motors 12 may be made different from each other (for example, V-shaped or inverted V-shaped when viewed from above). Alternatively, as the deceleration control, an interceptor may be provided and the interceptor may be driven. In addition, as the deceleration control, the shift position may be switched to the reverse state (R) or the neutral state (N). It should be noted that as the deceleration control, any deceleration methods described above may be combined in a complex manner.

It should be noted that also in the automatic marine vessel maneuvering mode process (FIG. 6), in the case of being judged that there is the collision possibility of the object with the marine vessel 10, at least one of the above-described deceleration controls other than the fixed point holding control may be executed.

Although the present invention has been described in detail based on the preferred embodiments described above, the present invention is not limited to these specific preferred embodiments, and various preferred embodiments within the scope not deviating from the gist of the present invention are also included in the present invention.

The present invention is also able to be implemented by a process of supplying a program that realizes one or more functions of the above-described preferred embodiments to a system or an apparatus via a network or a non-transitory storage medium, and one or more processors of a computer of the system or the apparatus reading out the program and executing it. The above program and a storage medium storing the above program may define a preferred embodiment of the present invention. In addition, a preferred embodiment of the present invention is also able to be implemented by a circuit (for example, an ASIC (application specific integrated circuit)) that implements one or more functions.

It should be noted that preferred embodiments of the present invention are applicable not only to marine vessels including outboard motors, but also to various types of marine vessels and jet boats that are propelled by inboard motors or inboard/outboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering system comprising:
    a controller configured or programmed to function as:
        a judging unit to judge whether or not there is a collision possibility of a collision between an object and a marine vessel; wherein
    the controller is configured or programmed to execute a deceleration control in response to the judging unit judging that there is the collision possibility;
    the deceleration control includes a fixed point holding control in which the controller keeps the marine vessel within a certain range by controlling a thrust applied to the marine vessel; and
    the controller is configured or programmed to start the fixed point holding control when a marine vessel speed becomes less than a predetermined speed.

2. The marine vessel maneuvering system according to claim 1, wherein, in a case that the object is within a predetermined distance from the marine vessel, the judging unit is configured or programmed to judge that there is the collision possibility.

3. The marine vessel maneuvering system according to claim 1, wherein, in a case that the object is within a predetermined distance from the marine vessel in a traveling direction of the marine vessel, the judging unit is configured or programmed to judge that there is the collision possibility.

4. The marine vessel maneuvering system according to claim 1, wherein, after starting the fixed point holding control as the deceleration control, the controller is configured or programmed to end the fixed point holding control in response to detection of an operation to set an operator, which switches a shift position, to a neutral position.

5. The marine vessel maneuvering system according to claim 1, wherein, before starting the fixed point holding control as the deceleration control, the controller is configured or programmed to fully close a throttle opening.

6. The marine vessel maneuvering system according to claim 5, wherein, in a case of being judged that there is the collision possibility, the controller is configured or programmed to execute a warning, and in a case that a predetermined period of time has elapsed after executing the warning, the controller is configured or programmed to fully close the throttle opening.

7. The marine vessel maneuvering system according to claim 5, wherein, after the throttle opening is fully closed, the controller is configured or programmed to switch a shift position to reverse and increase the throttle opening when a marine vessel speed becomes less than a first predetermined speed.

8. The marine vessel maneuvering system according to claim 7, wherein, after the throttle opening is fully closed, the controller is configured or programmed to start the fixed point holding control when the marine vessel speed becomes less than the predetermined speed that is slower than the first predetermined speed.

9. The marine vessel maneuvering system according to claim 1, wherein, in an automatic marine vessel maneuvering mode that maintains a direction of the marine vessel, the judging unit is configured or programmed to judge whether or not there is the collision possibility based on whether or not a collision with the object will occur on a predicted movement route of the marine vessel.

10. The marine vessel maneuvering system according to claim 1, wherein, in an automatic marine vessel maneuvering mode in which the marine vessel follows a set navigation course, the judging unit is configured or programmed to judge whether or not there is the collision possibility based on whether or not a collision with the object will occur on the set navigation course.

11. The marine vessel maneuvering system according to claim 9, wherein, in a case of being judged that there is the collision possibility, the controller is configured or programmed to interrupt the automatic marine vessel maneuvering mode and start the fixed point holding control as the deceleration control.

12. The marine vessel maneuvering system according to claim 11, wherein, after starting the fixed point holding control, the controller is configured or programmed to end the fixed point holding control and resume the automatic marine vessel maneuvering mode in a case of being judged that the collision possibility has disappeared.

13. The marine vessel maneuvering system according to claim 9, wherein, in a case of being judged that there is the collision possibility, the controller is configured or programmed to execute a warning, and in a case that a predetermined period of time has elapsed after executing the warning, the controller is configured or programmed to start the deceleration control.

14. A marine vessel maneuvering system comprising:
    a controller configured or programmed to function as:
        a judging unit to judge whether or not there is a collision possibility of a collision between an object with a marine vessel in a traveling direction of the marine vessel; wherein
    the controller is configured or programmed to execute a deceleration control in response to the judging unit judging that there is the collision possibility;
    the deceleration control includes a fixed point holding control in which the controller keeps the marine vessel within a certain range by controlling a thrust applied to the marine vessel; and the controller is configured or programmed to start the fixed point holding control when a marine vessel speed becomes less than a predetermined speed.

15. The marine vessel maneuvering system according to claim 14, wherein the deceleration control includes a control to fully close a throttle opening.

16. The marine vessel maneuvering system according to claim 15, wherein, in a case of being judged that there is the collision possibility, the controller is configured or programmed to execute a warning, and in a case that a predetermined period of time has elapsed after executing the warning, the controller is configured or programmed to fully close the throttle opening.

17. The marine vessel maneuvering system according to claim 15, wherein, after the throttle opening is fully closed, the controller is configured or programmed to switch a shift position to reverse and increase the throttle opening when a marine vessel speed becomes less than a first predetermined speed.

18. The marine vessel maneuvering system according to claim 17, wherein, after the throttle opening is fully closed, the controller is configured or programmed to start the fixed point holding control when the marine vessel speed becomes less than the predetermined speed that is slower than the first predetermined speed.

19. The marine vessel maneuvering system according to claim 14, wherein, after starting the deceleration control, the controller is configured or programmed to shift to a normal marine vessel maneuvering control in response to detection of an operation to set an operator, which switches a shift position, to a neutral position.

20. The marine vessel maneuvering system according to claim 14, wherein, in a case of being judged that there is the collision possibility, the controller is configured or programmed to execute the fixed point holding control after starting the deceleration control.

21. A marine vessel comprising:
a marine vessel maneuvering system including a controller configured or programmed to function as:
 a judging unit to judge whether or not there is a collision possibility of an object with the marine vessel; wherein the controller is configured or programmed to execute a deceleration control in response to the judging unit judging that there is the collision possibility;
the deceleration control includes a fixed point holding control in which the controller keeps the marine vessel within a certain range by controlling a thrust applied to the marine vessel; and
the controller is configured or programmed to start the fixed point holding contro when a marine vessel speed becomes less than a predetermined speed.

22. A marine vessel comprising:
a marine vessel maneuvering system including a controller configured or programmed to function as:
 a judging unit to judge whether or not there is a collision possibility of an object with the marine vessel in a traveling direction of the marine vessel; wherein
the controller is configured or programmed to execute a deceleration control in response the judging unit judging that there is the collision possibility;
the deceleration control includes a fixed point holding control in which the controller keeps the marine vessel within a certain range by controlling a thrust applied to the marine vessel; and
the controller is configured or programmed to start the fixed point holding control when a marine vessel speed becomes less than a predetermined speed.

* * * * *